United States Patent
Grieco

(10) Patent No.: US 10,683,883 B2
(45) Date of Patent: Jun. 16, 2020

(54) WEB COMPONENT AND METHOD OF MAKING A WEB COMPONENT

(71) Applicant: Gulfstream Aerospace Corporation, Savannah, GA (US)

(72) Inventor: James R. Grieco, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 193 days.

(21) Appl. No.: 15/085,773

(22) Filed: Mar. 30, 2016

(65) Prior Publication Data

US 2016/0281753 A1 Sep. 29, 2016

Related U.S. Application Data

(63) Continuation of application No. 13/954,334, filed on Jul. 30, 2013, now Pat. No. 9,341,207.

(51) Int. Cl.
| | |
|---|---|
| *F16B 5/00* | (2006.01) |
| *B64C 3/00* | (2006.01) |
| *F16B 5/07* | (2006.01) |
| *B21D 22/04* | (2006.01) |
| *F16B 5/12* | (2006.01) |

(Continued)

(52) U.S. Cl.
CPC .............. *F16B 5/07* (2013.01); *B21D 22/02* (2013.01); *B21D 22/04* (2013.01); *B21D 39/03* (2013.01); *B64C 1/061* (2013.01); *B64C 1/12* (2013.01); *B64C 3/187* (2013.01); *B64C 3/26* (2013.01); *F16B 5/121* (2013.01); *F16B 5/126* (2013.01); *F16B 11/006* (2013.01); *B21D 39/00* (2013.01); *Y10T 403/7045* (2015.01)

(58) Field of Classification Search
None
See application file for complete search history.

(56) References Cited

U.S. PATENT DOCUMENTS 2,390,761 A 12/1945 Watter
2,427,853 A * 9/1947 Goodlett .................. B64C 3/00
244/123.2

(Continued)

FOREIGN PATENT DOCUMENTS

| CN | 101432191 B | 3/2012 |
| GB | 122649 A | 5/1920 |
| GB | 2420606 A | 5/2006 |

OTHER PUBLICATIONS

Intellectual Property Office of Great Britain, Combined Search and Examination Report in Application No. GB1413499.3, dated Jun. 24, 2015.

(Continued)

*Primary Examiner* — Kyle J. Walraed-Sullivan
(74) *Attorney, Agent, or Firm* — LKGlobal | Lorenz & Kopf, LLP

(57) ABSTRACT

A web component suitable for use with a snap-fit assembly is disclosed herein. The web component includes, but is not limited to, a sheet metal member that has a periphery and a first side and a second side. The sheet metal member also includes a plurality of protrusions that extend from a first surface of the first side and from a second surface of the second side. The plurality of protrusions are disposed proximate a portion of the periphery and are configured to engage a female receiver associated with the snap-fit assembly.

20 Claims, 8 Drawing Sheets

(51) Int. Cl.
*F16B 11/00* (2006.01)
*B64C 1/06* (2006.01)
*B64C 1/12* (2006.01)
*B64C 3/18* (2006.01)
*B64C 3/26* (2006.01)
*B21D 22/02* (2006.01)
*B21D 39/03* (2006.01)
*B21D 39/00* (2006.01)

(56) References Cited

U.S. PATENT DOCUMENTS

| | | | |
|---|---|---|---|
| 2,983,778 A | | 5/1961 | Munse |
| 4,356,616 A | * | 11/1982 | Scott ................ B64C 3/187 |
| | | | 244/123.1 |
| 4,452,657 A | * | 6/1984 | Hamm ................ B29D 24/008 |
| | | | 156/198 |
| 4,569,424 A | * | 2/1986 | Taylor, Jr. ........... B29C 37/0082 |
| | | | 188/250 G |
| 5,242,523 A | | 9/1993 | Willden et al. |
| 5,258,217 A | * | 11/1993 | Lewis ................ B32B 3/30 |
| | | | 405/129.6 |
| 5,285,615 A | | 2/1994 | Gilmour |
| 5,330,644 A | | 7/1994 | Nilsson |
| 5,356,688 A | | 10/1994 | MacLean et al. |
| 5,442,885 A | * | 8/1995 | Laven ................ E04C 3/07 |
| | | | 29/453 |
| 5,501,414 A | | 3/1996 | Baurer |
| 5,613,339 A | | 3/1997 | Pollock |
| 5,806,797 A | | 9/1998 | Micale |
| 6,125,603 A | | 10/2000 | Amore |
| 6,367,600 B1 | * | 4/2002 | Arbesman ............. B21D 28/10 |
| | | | 188/250 B |
| 6,386,481 B1 | | 5/2002 | Kallinen |
| 6,684,593 B2 | | 2/2004 | Brenneis et al. |
| 7,740,202 B2 | * | 6/2010 | Namaizawa ............. B64C 3/18 |
| | | | 244/117 R |
| 8,245,971 B2 | * | 8/2012 | Makela ................... B64C 3/187 |
| | | | 244/123.1 |
| 2001/0015043 A1 | * | 8/2001 | Brenneis .................. B64C 1/12 |
| | | | 52/630 |
| 2003/0124304 A1 | | 7/2003 | Michael et al. |
| 2006/0180414 A1 | * | 8/2006 | Jung .................. F16D 69/0408 |
| | | | 188/250 B |
| 2009/0178363 A1 | | 7/2009 | Pilz et al. |
| 2009/0314892 A1 | | 12/2009 | Kunich et al. |
| 2010/0006700 A1 | | 1/2010 | Stuhr et al. |
| 2010/0107513 A1 | | 5/2010 | Buchanan et al. |
| 2010/0233427 A1 | * | 9/2010 | De Giuseppe ............ B32B 3/30 |
| | | | 428/119 |
| 2011/0147522 A1 | | 6/2011 | Williams |
| 2013/0323140 A1 | * | 12/2013 | Motadel ................ B01L 3/0275 |
| | | | 422/524 |

OTHER PUBLICATIONS

State Intellectual Property Office of the Peoples Republic of China, First Office Action in Application No. 2014103712101, dated Feb. 16, 2016.

State Intellectual Property Office of the Peoples Republic of China, Search Report in Application No. 2014103712101, dated Feb. 16, 2016.

Israel Patent Office, Office Action in Israeli Patent Application No. 233890 dated May 4, 2017.

* cited by examiner

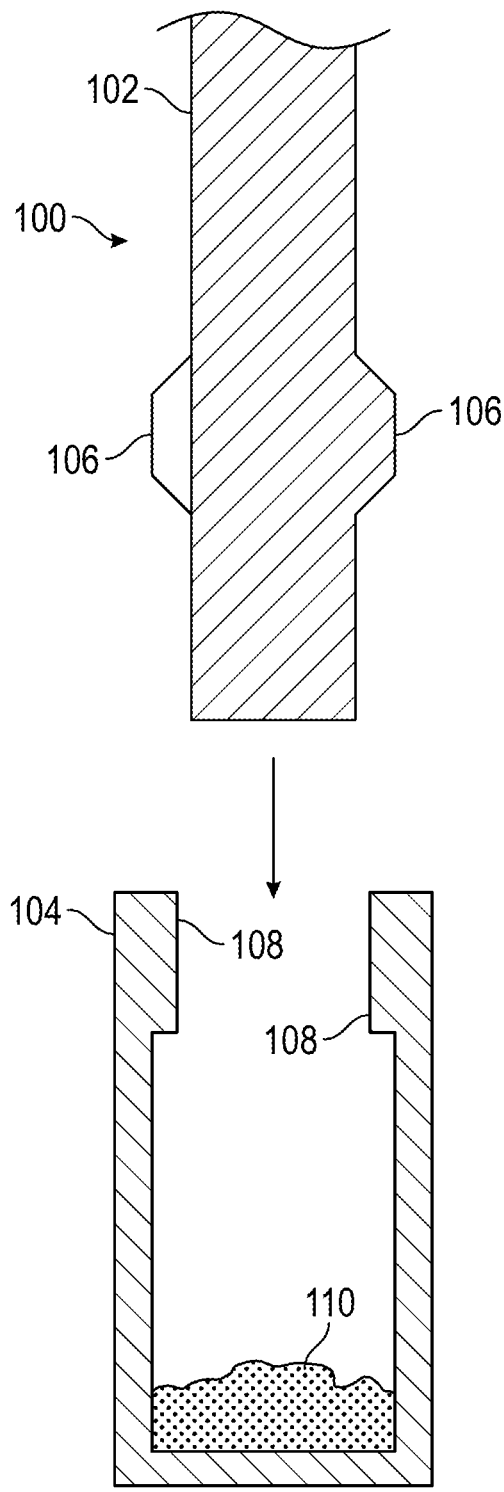
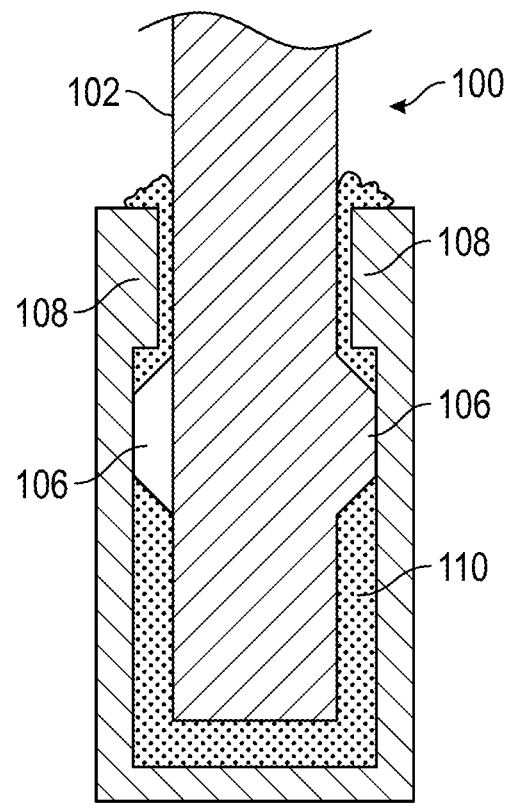
FIG. 9
FIG. 10

WEB COMPONENT AND METHOD OF MAKING A WEB COMPONENT

CROSS-REFERENCE TO RELATED APPLICATIONS

This Application is a continuation of Non-Provisional U.S. patent application Ser. No. 13/954,334, filed Jul. 30, 2013, and entitled "Web Component And Method Of Making A Web Component" which is incorporated herein by reference in its entirety.

TECHNICAL FIELD

The present invention generally relates to structural components and more particularly relates to a web component suitable for use with a snap-fit assembly.

BACKGROUND

Conventional aircraft typically include wings, horizontal stabilizers, vertical stabilizers, and other load bearing components having relatively thin profiles. As disclosed in pending U.S. patent application Ser. No. 13/800,464, such components may be constructed by taking multiple subcomponents that are equipped with a snap-fit feature (either a male feature or female receiver), applying an adhesive to the snap-fit feature, snap-fitting the subcomponents together via their snap-fit features and allowing the adhesive to cure. U.S. patent application Ser. No. 13/800,464 further teaches that such subcomponents may be fabricated by taking a metal blank and machining it down to a desired thickness to form a web component. The web component is further machined to form a male or female snap-fit feature. The load-bearing component fabricated from such subcomponents is a light weight, robust structure that has fewer components and a lower weight than a traditional component constructed from multiple subcomponents that have been riveted or otherwise mechanically fastened together.

While the above solution is adequate, there is room for improvement. The above described component uses a metal blank that is machined down to a desired thickness to form a web component. In applications where the desired thickness is relatively thin, the machining process can result in substantial amounts of wasted metal material. In addition, in applications where the metal blank must be machined down to a very small thickness, the process of machining the metal blank may cause the metal to curl or experience other types of undesired deformation. Such deformations may require the implementation of corrective measures. These corrective measures, in turn, add time, cost, and complexity to the fabrication of the web component.

Accordingly, it is desirable to provide a web component that is suitable for use in a snap-fit assembly but that does not give rise to substantial waste. In addition, it is desirable to provide a web component that can be fabricated without curling or without the occurrence of other deformations or undesired effects that would require corrective measures. Furthermore, other desirable features and characteristics will become apparent from the subsequent summary and detailed description and the appended claims, taken in conjunction with the accompanying drawings and the foregoing technical field and background.

BRIEF SUMMARY

Various embodiments of a web component suitable for use with a snap-fit assembly and various embodiments of a method of making the web component are disclosed herein.

In a first non-limiting embodiment, the web component includes, but is not limited to, a sheet metal member that has a periphery and a first side and a second side. The sheet metal member also includes a plurality of protrusions that extend from a first surface of the first side and from a second surface of the second side. The plurality of protrusions are disposed proximate a portion of the periphery and are configured to engage a female receiver associated with the snap-fit assembly.

In a second non-limiting embodiment, the method includes, but is not limited to, cutting a sheet metal member in a predetermined pattern to form a periphery. The method further includes, but is not limited to, forming a plurality of protrusions proximate a portion of the periphery, the plurality of protrusions projecting from opposite sides of the web component in an alternating pattern.

In yet another non-limiting embodiment, the web component includes, but is not limited to, a sheet metal member having a periphery and a first side and a second side. The sheet metal member includes a plurality of protrusions extending from a first surface of the first side and from a second surface of the second side. The plurality of protrusions are disposed proximate a portion of the periphery and are configured to engage a female receiver associated with the snap-fit assembly. Each protrusion of the plurality of protrusions alternates between the first surface and the second surface. The plurality of protrusions are disposed in a substantially continuous and uninterrupted pattern along the portion of the periphery. An opening is defined through a central portion of the sheet metal member and a flange is defined around the opening. Each protrusion of the plurality of protrusions are substantially uniform in configuration. The plurality of protrusions are arranged in a pattern corresponding to the portion of the periphery and each protrusion of the plurality of protrusions is substantially equidistant from an edge of the portion of the periphery.

BRIEF DESCRIPTION OF THE DRAWINGS

The present invention will hereinafter be described in conjunction with the following drawing figures, wherein like numerals denote like elements.

FIG. 9 is a schematic fragmentary side view illustrating the web component of FIG. 3 prior to engagement with a female receiver;

FIG. 10 is a schematic fragmentary side view illustrating the web component of FIG. 9 subsequent to engagement with the female receiver;

DETAILED DESCRIPTION

The following detailed description is merely exemplary in nature and is not intended to limit the invention or the application and uses of the invention. Furthermore, there is no intention to be bound by any theory presented in the preceding background or the following detailed description.

An improved web component suitable for use with a snap-fit assembly, and a method for making the improved web component, are disclosed herein. The improved web component comprises a sheet metal member that has been cut or otherwise formed to have a periphery that is suitable for use with a snap-fit assembly. For example, the sheet metal component may be cut or formed to serve as a spar in a snap-fit assembly such as a wing or an air foil. In another example, the sheet metal component may be cut or formed to serve as a rib in a snap-fit assembly such as a wing or an air foil. In still other embodiments, the sheet metal component may be cut or formed to serve as any other subcomponent or structure of a snap-fit assembly. By starting the fabrication process with a sheet metal member rather than starting with a relatively thick metal blank and then machining away excess material, the web component of the present disclosure avoids much of the waste associated with fabrication of the web component described in the Background Section above.

Because the sheet metal member is not machined to a desired configuration, it does not include the male snap-fit feature ("male feature") or the female snap-fit receiver ("female receiver"). To enable the sheet metal member to cooperate with a female receiver in a snap-fit coupling, a plurality of protrusions are formed in the sheet metal member proximate the periphery of the sheet metal member. The plurality of protrusions may be imparted to the sheet metal member in any suitable manner including, but not limited to, stamping, cold rolling, pressing, crimping, dimpling, and/or any other method of metal forming, either presently known or developed hereafter.

The plurality of protrusions extend from opposite surfaces of the web component to provide for engagement with opposite sides of the female receiver. This ensures a suitable snap-fit coupling. In addition, it may substantially center the web component within the female receiver to permit a substantially uniform allocation of the adhesive. In some non-limiting embodiments, each protrusion of the plurality of protrusions may alternate between opposite sides of the web component. In other embodiments, the plurality of protrusions may have any other suitable pattern whereby some of the protrusions protrude from one side of the web component and some of the protrusions protrude from the opposite side of the web component.

A greater understanding of the web component described above and of the method for forming the web component may be obtained through a review of the illustrations accompanying this application together with a review of the detailed description that follows.

Figure 1:
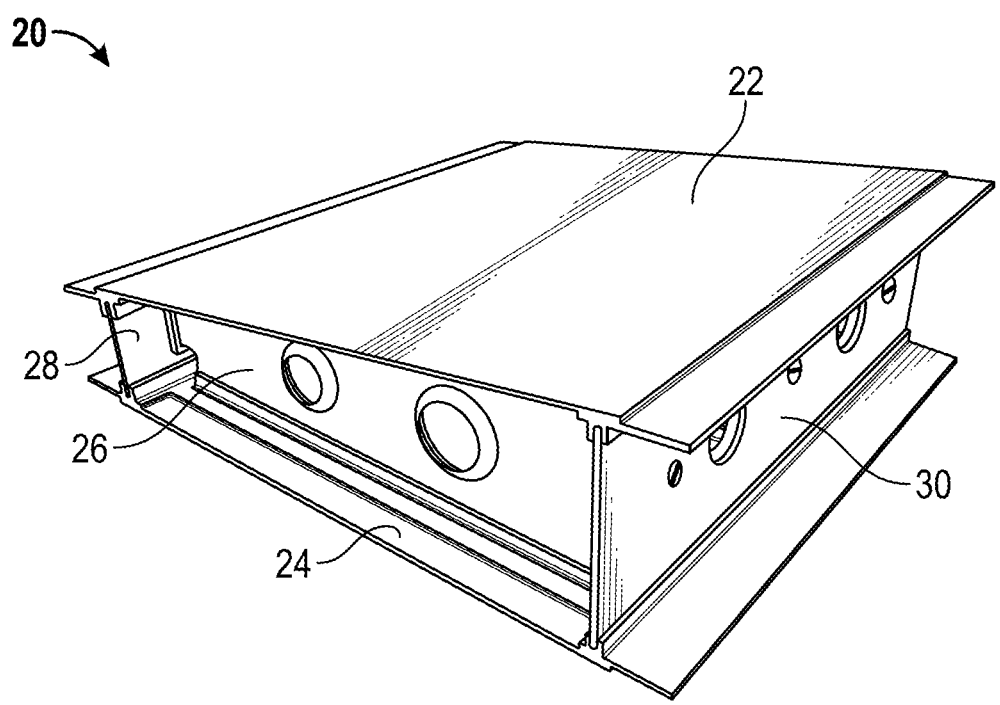
FIG. 1 is a perspective view illustrating a snap-fit assembly.

FIG. 1 is a perspective view of a snap-fit assembly 20. Snap-fit assembly 20 is comprised of multiple sub-components, including spars, ribs, and planar surfaces that are coupled together in a snap-fit arrangement. In some embodiments, an adhesive may be applied to each snap-fit coupling or joint prior to snap fit engagement to ensure that the various sub-components remain coupled to one another throughout the life of snap-fit assembly 20. In other components, the snap-fit joint itself is sufficient to ensure the longevity of the joint. In still other embodiments, other means may be employed to ensure that the snap-fit joint remain coupled. For example, and without limitation, welding, friction stir welding and/or mechanical fastening may be employed to reinforce the snap-fit joint. In the illustrated example, snap-fit assembly 20 is configured as a segment of an airfoil for use on an aircraft. Although the teachings herein are disclosed and described in the context of an implementation on an aircraft, it should be understood that the teachings herein are not limited to use in aircraft-related applications. Rather, the teachings herein may be applied in any desirable and/or suitable field of endeavor. For example, and without limitation, the teachings herein may be employed in the construction of any type of vehicle such as land-based vehicle, any type of water craft, and any type of space craft. Additionally, the teachings herein are not limited to use in connection with the manufacture of vehicles, but are applicable to any other field of endeavor where structures are constructed from sub-components. For example, and without limitation, the teachings herein may be applied in the manufacture of consumer goods, durable goods, and building construction.

Snap-fit assembly 20 includes an upper panel 22, a lower panel 24, and a plurality of web components such as ribs 26, a spar 28, and a spar 30. In the illustrated embodiment, snap-fit assembly 20 comprises a segment of an airfoil for use on board an aircraft (e.g., a horizontal stabilizer, a flap, a wing, and the like). Upper panel 22 comprises an upper surface of the airfoil and lower panel 24 comprises a lower surface of the airfoil. Therefore, while the aircraft is in flight, upper panel 22 and lower panel 24 come into direct contact with the free stream through which the aircraft is flying.

Upper panel 22 and lower panel 24 are supported by spar 28 and spar 30 and further by plurality of ribs 26. As snap-fit assembly 20 moves through the free stream, a portion of the onrushing air causes a downward force to be applied to upper panel 22. Similarly, a portion of the onrushing air causes an upward force to be applied to lower panel 24. Further, depending upon the condition of flight, the free stream can apply either a positive or a negative force to upper panel 22 and lower panel 24. Spar 28, spar 30, and the plurality of ribs 26 are oriented substantially perpendicularly to upper panel 22 and lower panel 24. These internal structures resist the downward and upward forces imparted by the free stream and support the panels in a manner that inhibits inward deformation when exposed to the free stream. The load imparted by an oncoming free stream is transmitted through spars 28 and 30 and through plurality of ribs 26 in a direction that is substantially aligned with a vertical axis of these components. Because these components are coupled to one another in a matrix-like configuration, they provide mutual support to one another and, consequently, these structures may be relatively thin and still adequately provide the necessary structural support.

Figure 2:
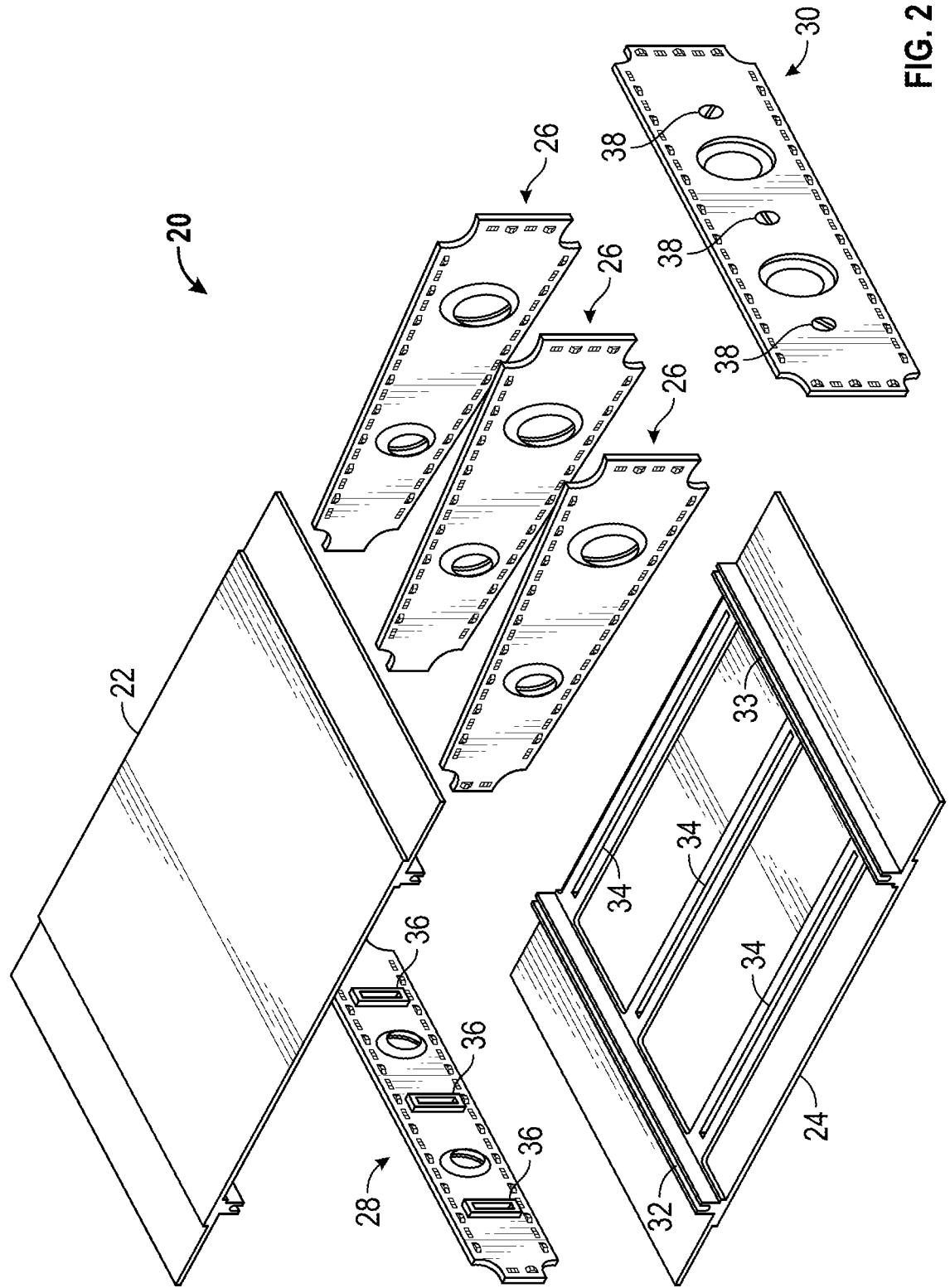
FIG. 2 is an exploded view of the snap-fit assembly of FIG. 1 illustrating various non-limiting embodiments of a web component made in accordance with the teachings of the present disclosure.

FIG. 2 is an exploded view illustrating the various sub-components of snap-fit assembly 20. In the illustrated embodiment, snap-fit assembly 20 comprises two spars (spar 28 and spar 30) and three ribs 26. In other embodiments, any other suitable number of spars and ribs may be employed. Each of the three ribs 26 can each be coupled in a snap-fit fashion with lower panel 24 by inserting a lower end of each rib 26 into a female receiver 34 of lower panel 24. Upper panel 22 also includes female receivers (not shown) configured to receive an upper end of rib 26. Similarly, spar 28 and spar 30 can be coupled in a snap-fit fashion with lower panel 24 by inserting a lower end of each spar into a respective female receiver 32 and 33. Similarly, spar 28 and spar 30 can be coupled in a snap-fit fashion with upper panel 22 by inserting an upper end of each spar into a respective female receiver associated with upper panel 22.

Further, ribs 26 are configured to be coupled in a snap-fit manner to spar 28 and spar 30. To facilitate this snap-fit coupling, a plurality of female receivers 36 may be affixed to the sheet metal member comprising spar 28. In the illustrated example, the female receivers are attached to the sheet metal member via threaded fasteners 38. In other embodiments, the affixing of female receivers 36 to the sheet metal member may be accomplished in any suitable manner including, without limitation, via the use of an adhesive or via any suitable welding technique. A forward end of each rib 26 may be snap-fitted into female receivers 36 of spar 28 and rearward end of each rib 26 may be snap-fitted into female receivers of spar 30 to form a lattice-like structure. Once assembled in this manner, the lattice-like structure may then be snap-fit coupled into upper panel 22 and lower panel 24. When assembling the various sub-components together, an adhesive may be applied to the female receivers and/or the male ends of each component prior to insertion of the end portions of ribs 26 and spars 28 into the female receives of upper panel 22 and lower panel 24. The use of an adhesive combined with the snap-fitted coupling of the various sub-components provides snap-fit assembly 20 with a robust and durable construction.

Figure 3:
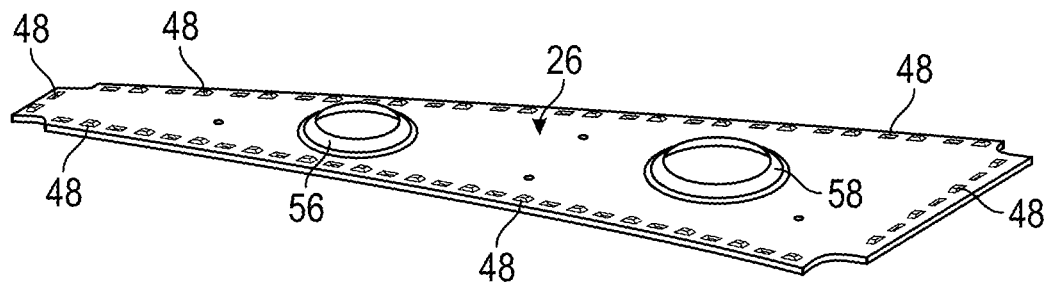
FIG. 3 is a perspective view illustrating the web component illustrated in FIG. 2.
Figure 4:
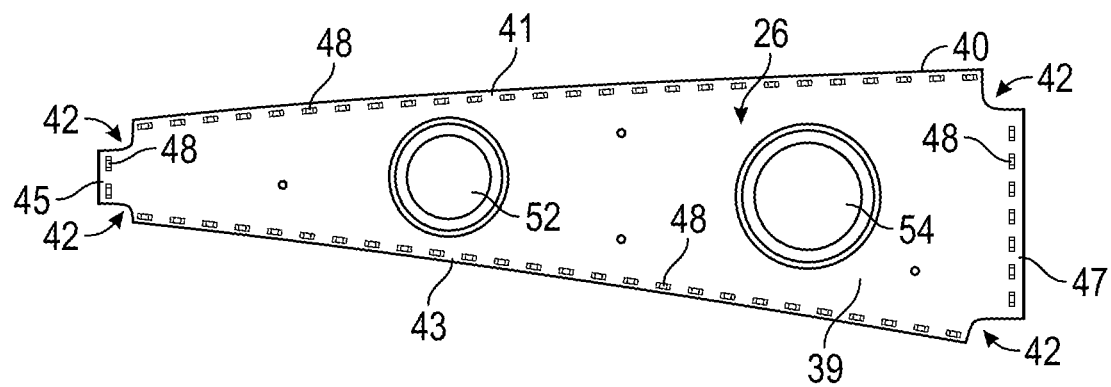
FIG. 4 is a plan view illustrating the web component of FIG. 3.
Figure 5:
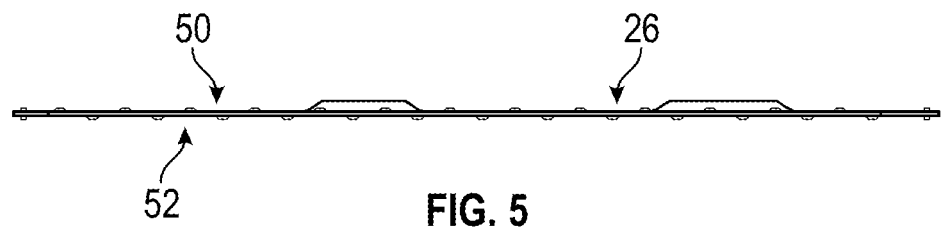
FIG. 5 is a side view illustrating the web component of FIG. 3.

With reference to FIGS. 3-5, FIG. 3 is an expanded perspective view of rib 26, FIG. 4 is a plan view of rib 26, and FIG. 5 is a side view of rib 26. As best seen in FIG. 4, rib 26 comprises a sheet metal member 39 having a periphery 40. In the illustrated embodiment, periphery 40 has a truncated triangular configuration. In other embodiments, rib 26 may have a periphery of any suitable or desirable configuration. Upper end 41 and lower end 43 are configured to engage female receivers 34 (see FIG. 2) of upper panel 22 and lower panel 24 respectively. Similarly, forward end 45 and rear end 47 are configured to engage female receivers 36 (see FIG. 2) mounted to spar 28 and spar 30, respectively. A corner relief opening 42 is provided at the approximate corners of rib 26 to facilitate bending of the various ends of rib 26 without creating interference from either of the adjacent ends. Corner relieve openings 42 also facilitate the metal working operations that create the plurality of protrusions around the periphery of the sheet metal component.

Rib 26 includes a plurality of protrusions 48 disposed at a substantially uniform distance from periphery 40. Plurality of protrusions 48 are situated around substantially the entire periphery 40 of rib 26. As best seen in FIG. 5, rib 26 has a first side 50 and a second side 52. Some protrusions of plurality of protrusions 48 protrude from a surface of first side 50 while other protrusions of plurality of protrusions 48 protrude from a surface of second side 52. These protrusions are best seen in FIG. 5 and also in the expanded views provided in FIGS. 6-8, discussed below. By protruding from opposite sides of sheet metal member 39, the plurality of protrusions 48 combine to mimic a spur or raised lip on the surface of rib 26. By mimicking a spur or raised lip, the plurality of protrusions 48 enable upper end 41, lower end 43, forward end 45, and rear end 47 to engage with respective female receivers in a snap-fit relationship. Plurality of protrusions 48 may be formed in sheet metal member 39 by any conventional method or any method of forming metal developed hereafter. Plurality of protrusions 48 may be formed by hand or by machine or by combinations thereof.

As best seen in FIG. 4, a lightening hole 52 and a lightening hole 54 extend through sheet metal member 39. Lightening hole 52 and lightening hole 54 provide a void in sheet metal member 39 that reduces the weight of rib 26. In other embodiments, a greater or smaller number of lightening holes may be employed. A flange 56 and a flange 58 (see FIG. 3) are disposed around lightening holes 52 and 54, respectively and protrude outward from first side 50. In other embodiments, one or both flanges 56 and 58 may protrude from side 52 without departing from the teachings of the present disclosure. Flanges 56 and 58 increase the stiffness of rib 26 and thereby assist rib 26 in resisting deformation while rib 26 is under load.

Figure 6:
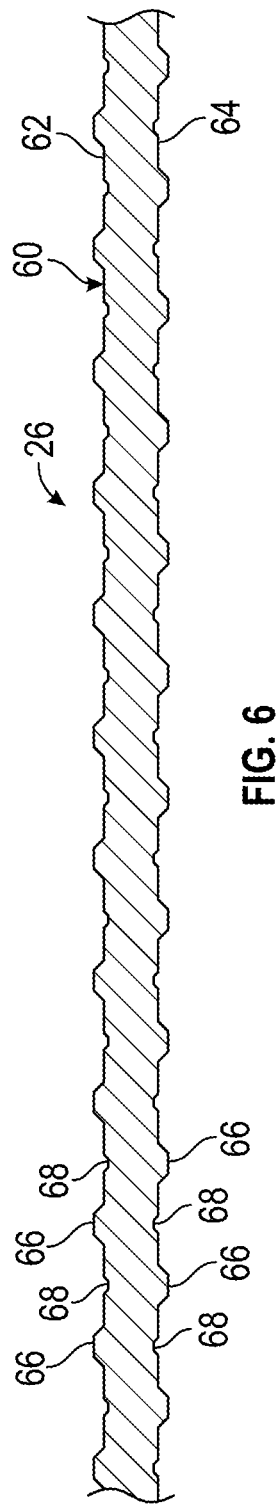
FIG. 6 is an expanded fragmentary side view illustrating a portion of the web component of FIG. 3.
Figure 7:
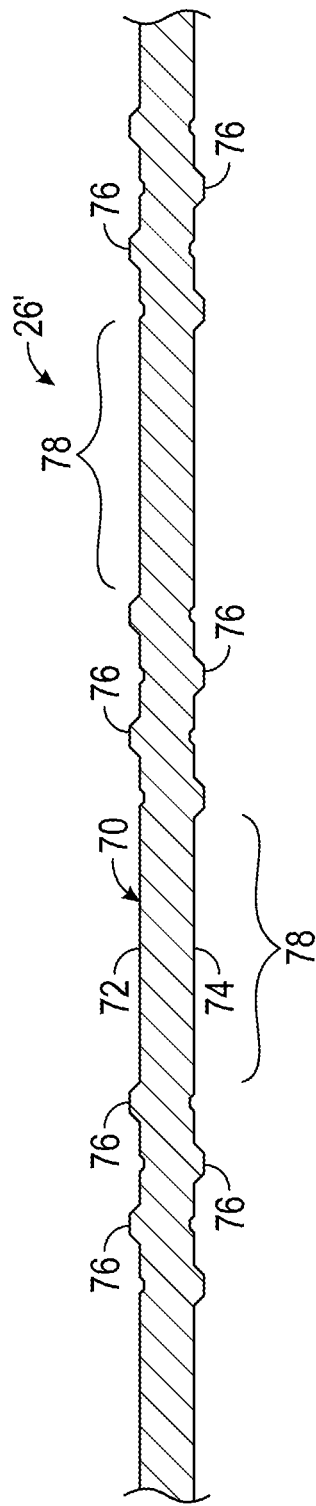
FIG. 7 is an expanded fragmentary side view illustrating a portion of an alternate embodiment of the web component of FIG. 3.
Figure 8:
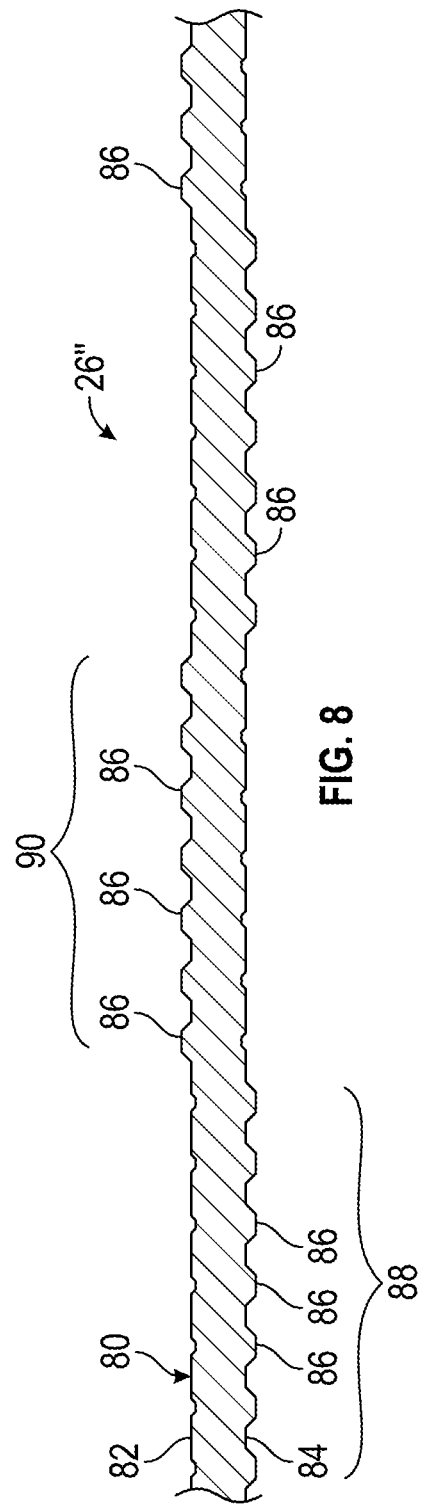
FIG. 8 is another expanded fragmentary side view illustrating another alternate embodiment of the web component of FIG. 3.

With continuing reference to FIGS. 1-5, FIGS. 6-8 illustrate expanded, fragmentary views of different embodiments of rib 26. FIGS. 6-8 illustrate rib 26 from an angle that permits viewing the edge of rib 26. The different embodiments of rib 26 illustrated in FIGS. 6-8 each have different end portions for engaging a female receiver. Rib 26 may employ one, some, or all of the different configurations depicted in FIGS. 6-8 or may employ any other suitable configuration employing other protrusion patterns.

With respect to FIG. 6, an end portion 60 of rib 26 has a first side 62 and a second side 64. End portion 60 includes a plurality of protrusions 66 and a plurality of depressions 68. In this embodiment, each protrusion of plurality of protrusions 66 extends in an alternating pattern from opposite sides of end portion 60. Further, the alternating pattern of plurality of protrusions 66 extends in a continuous and substantially uninterrupted manner along substantially the entire length of end portion 60. This pattern creates a substantially uninterrupted "spur" for engagement with a female receiver on an adjacent sub-component of snap-fit assembly 20.

With respect to FIG. 7, an end portion 70 of rib 26' has a first side 72 and a second side 74. End portion 70 includes a plurality of protrusions 76. In the embodiment illustrated in FIG. 7, each protrusion of plurality of protrusions 76 extends in an alternating pattern from opposite sides of end portion 70, but in contrast to the pattern shown in FIG. 6, the pattern illustrated in FIG. 7 is interrupted periodically by intermittent lengths of smooth surface 78. Such a pattern may be appropriate where an adjacent component has a plurality of female receivers rather than a single continuous female receiver extending across the component. This configuration can also be used to control or limit the amount of insertion force necessary to snap the male feature into the female feature.

With respect to FIG. 8, an end portion 80 of rib 26" has a first side 82 and a second side 84. End portion 80 includes a plurality of protrusions 86. In this embodiment, the protrusions 86 are arranged in groups. Each group includes a plurality of consecutive protrusions 86 protruding from the same side of rib 26" and the groups are arranged to alternate such that their protrusions protrude from opposite sides of rib 26". For example, the protrusions 86 of group 88 each protrude from second side 84 while the protrusions 86 of group 90 protrude from first side 82. The groups are disposed along substantially the entire length of end portion 80 in an alternating pattern.

It should be understood that the patterns of protrusions extending from the surfaces of rib 26 which have been illustrated in FIGS. 6-8 are not exhaustive. Rather, other patterns of protrusions are possible without departing from the teachings of the present disclosure.

FIGS. 9 and 10 are schematic fragmentary side views of a web component of the present disclosure and depict engagement of an end portion of the web component with a female receiver. With respect to FIG. 9, an end portion 102 of a web component 100 is positioned above a female receiver 104 and aligned therewith. Web component 100 includes a plurality of protrusions 106 that protrude from opposite sides of end portion 102. Protrusions 106 are configured to engage with an underside of a pair of flanges 108 of female receiver 104. When end portion 102 is pushed into the opening of female receiver 104, the pair of flanges 108 will move aside under the camming force exerted by protrusions 106. The outward movement of pair of flanges 108 permits end portion 102 to fully enter female receiver 104 and become seated therein. As illustrated in FIG. 10, once protrusions 106 have moved past a bottom end of each flange 108, flanges 108 will return to their original position (e.g., they snap back into place) and web component 100 will be obstructed from coming out of engagement with female receiver 104 by the engagement between protrusions 106 and the underside of flanges 108.

As illustrated in FIG. 9, a quantity of adhesive 110 has been deposited along a bottom portion of female receiver 104 prior to insertion of end portion 102. The adhesive is a bonding agent that, when cured, will ensure a robust coupling of web component 100 with female receiver 104. When end portion 102 is pushed into female receiver 104, adhesive 110 becomes partially displaced and redistributed throughout the channel formed by female receive 104, thus coating both an internal surface of the channel as well as the portion of end portion 102 that engages female receiver 104.

Figure 11:
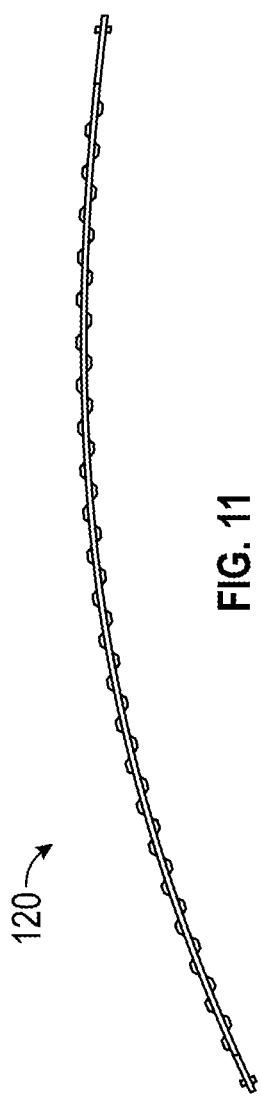
FIG. 11 is a side view illustrating an alternate embodiment of the web component of FIG. 3.

FIG. 11 is a side view illustrating an alternate embodiment of a web component 120 of the present disclosure. With continuing reference to FIGS. 1-10, the various web components discussed above have each had a substantially planar configuration such that each web component was substantially flat. FIG. 11 presents a side view of web component 120 that reveals an edge portion. In this view, it can be seen that web component 120 is not planar, but rather, it has a curvature along a longitudinal axis. Such curvature may be desirable to provide web component 120 with an added measure of stiffness to resist loads transmitted through its vertical axis. In other instances, this curvature may be dictated by a corresponding curvature or arrangement of the female receiver or female receivers associated with an upper panel or a lower panel to which web component 120 will be coupled.

Figure 12:
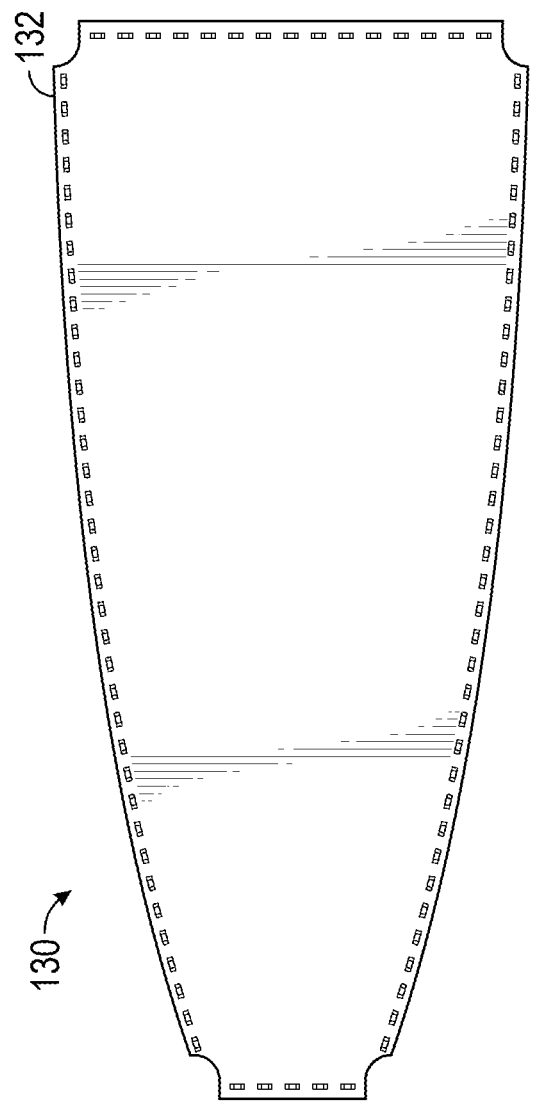
FIG. 12 is a plan view illustrating another alternate embodiment of the web component of FIG. 3.

FIG. 12 is a plan view of another alternate embodiment of a web component 130 of the present disclosure. With continuing reference to FIGS. 1-10, the various web components discussed above each had a periphery that comprised a plurality of substantially straight edges. As illustrated in FIG. 12, web component 130 has a periphery 132 that includes at least two curved edges. Such a configuration may be necessary in circumstances where the upper surface and/or the lower surface to which web component 130 is to be joined has a curvature.

Figure 13:
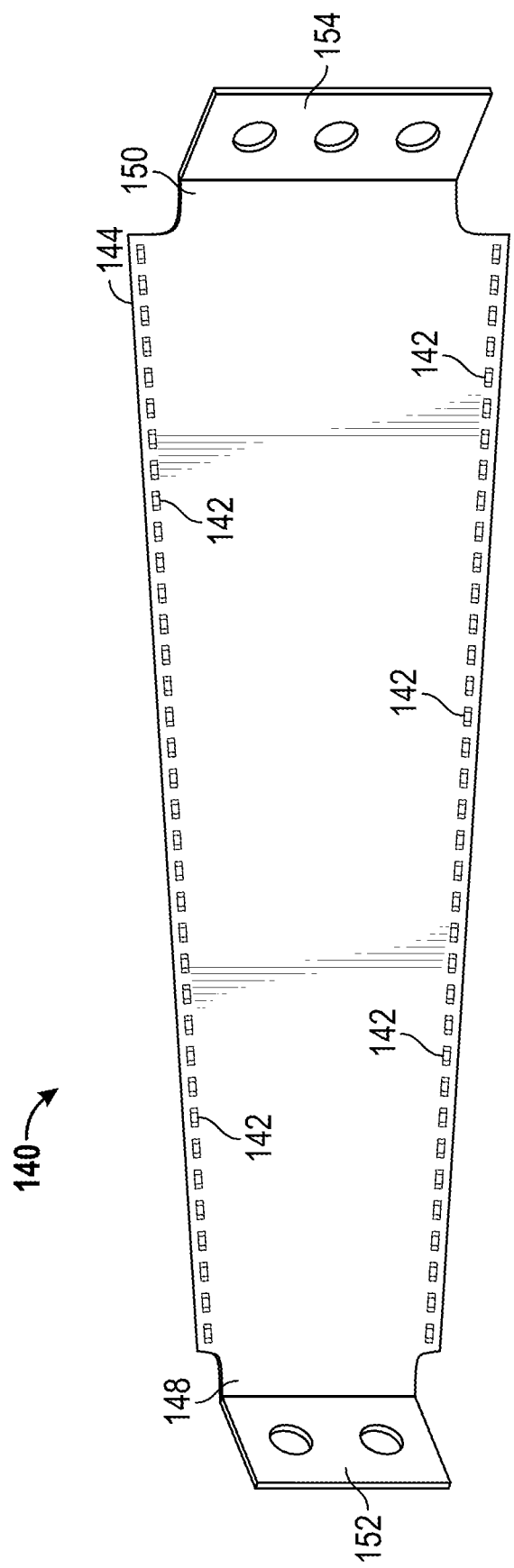
FIG. 13 is a perspective view illustrating yet another alternate embodiment of the web component of FIG. 3.

FIG. 13 is a perspective view of another alternate embodiment of a web component 140 of the present disclosure.

With continuing reference to FIGS. 1-10, web component 140 is very similar to rib 26 illustrated in FIGS. 2-5. However, whereas rib 26 has a plurality of protrusions 48 that extend along substantially the entire periphery 40 of rib 26, with respect to web component 140, a plurality of protrusions 142 extend along only an upper edge 144 and a lower edge 146 of web component 140. A forward end 148 and a rear end 150 of web component 140 are substantially devoid of protrusions and instead include a flange 152 and a flange 154, respectively. Flanges 152 and 154 include a fastener opening 156 and a fastener opening 158, respectively. Web component 140 is configured for use with a snap-fit component having spars that lack female receivers. Accordingly, upper edge 144 and lower edge 146 may be snap-fitted into upper and lower panels, respectively, of a snap-fit component, and may further be coupled to the spars of such a snap-fit component by means of a mechanical fastener such as a threaded fastener. Such an arrangement would obviate the need to fit mid sections of the spars with female receivers.

Figure 14:
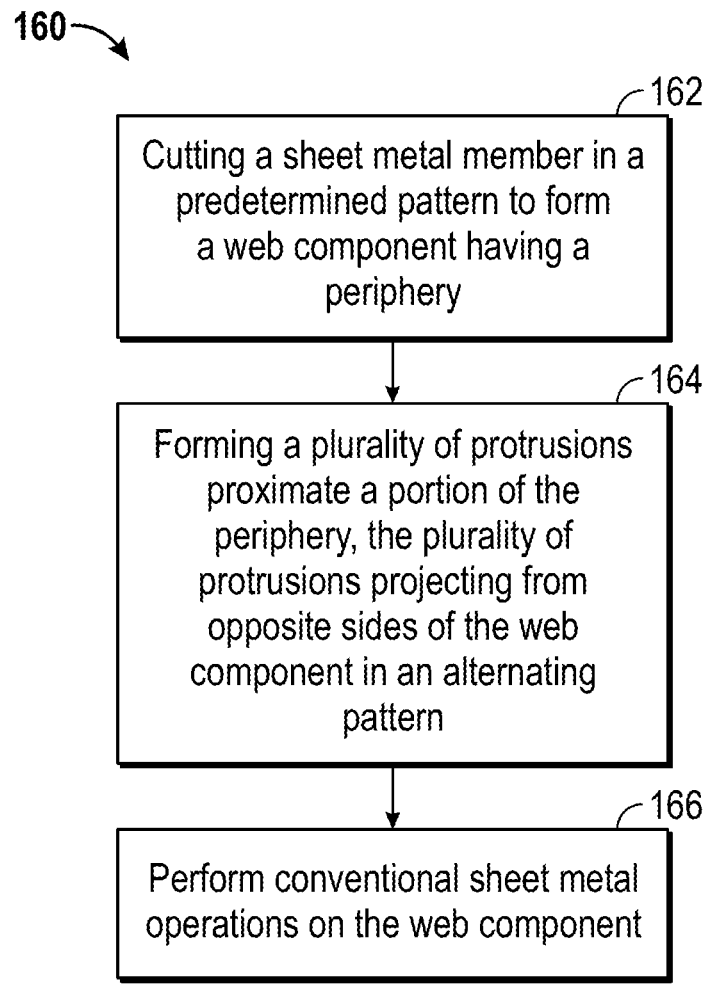
FIG. 14 is a flow chart illustrating a non-limiting embodiment of a method of making a web component in accordance with the teachings of the present disclosure.

FIG. 14 is a flow chart illustrating a non-limiting embodiment of a method 160 of making a web component in accordance with the teachings of the present disclosure. At step 162, a sheet metal member is cut in a predetermined pattern to form a web component having a periphery. For example, the periphery may be similar to that depicted for rib 26 or spar 28 or spar 30 of FIG. 2. In other embodiments, the periphery may be similar to that depicted for web component 132 of FIG. 12. In still other embodiments, the periphery may have any suitable shape and size. The sheet metal member may be cut using any known metal cutting/forming technologies or any metal cutting/forming technologies hereafter developed.

At step 164, a plurality of protrusions are formed near the periphery of the sheet metal member. In some embodiments, the plurality of protrusions may extend along substantially the entire periphery while in other embodiments, the plurality of protrusions may extend along only a portion of the periphery. The plurality of protrusions are configured to project from opposite sides of the sheet metal member in an alternating pattern. With continuing reference to FIGS. 6-8, the alternating pattern may be a continuous arrangement of alternating protrusions or it may be a dis-continuous pattern of alternating protrusions interrupted by relatively smooth surfaces of the sheet metal member or the protrusions may be arranged in groups that alternate between opposite sides of the sheet metal member. In other embodiments, any other desirable arrangement of protrusions may be employed wherein at least one of the protrusions protrudes from a first side of the sheet metal member and wherein at least one of the protrusions protrudes from a second side of the sheet metal member.

At block 166, any desired sheet metal operation may be performed to the web component. For example, and without limitation, the web component may be formed into a non-planar configuration and/or portions of the web component may be bent to form flanges and/or the web component may be hydroformed to give it any desired complex curvature or other shape, and/or or any other conventional metal working technique or any metal working technique hereafter developed may be employed to further form the web component as desired.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the disclosure as set forth in the appended claims.

What is claimed is:

1. A web component suitable for use with a snap-fit assembly, the web component comprising:
a unitary sheet metal member having a periphery, a first side and a second side, the sheet metal member including a plurality of protrusions integral with the sheet metal member, the plurality of protrusions extending from a first surface of the first side and from a second surface of the second side, the plurality of protrusions disposed in a region proximate a portion of the periphery and inset from the portion of the periphery, the sheet metal member further including a plurality of depressions extending into the first surface and into the second surface, the plurality of depressions being disposed in the region, the plurality of depressions being aligned with the plurality of protrusions, each depression of the plurality of depressions being spaced apart from each protrusion of the plurality of protrusions along the first side and the second side, the sheet metal member having a central region located within the periphery, the region forming an outer border of the central region, the central region being free of protrusions and depressions,
wherein the central region comprises a majority portion of the unitary sheet metal member.

2. The web component of claim 1, wherein each protrusion of the plurality of protrusions alternates between the first surface and the second surface.

3. The web component of claim 1, wherein the plurality of protrusions are disposed in a substantially continuous and uninterrupted pattern along the portion of the periphery.

4. The web component of claim 1, wherein the plurality of protrusions are disposed in an intermittent pattern along the portion of the periphery.

5. The web component of claim 1, wherein the portion of the periphery comprises substantially all of the periphery.

6. The web component of claim 1, wherein the sheet metal member comprises a rib element.

7. The web component of claim 1, wherein the sheet metal member comprises a spar element.

8. The web component of claim 7, further comprising a female receiver disposed on one of the first surface and the second surface.

9. The web component of claim 8, wherein the female receiver is mechanically fastened to the one of the first surface and the second surface.

10. The web component of claim 1, wherein a second portion of the periphery includes a flange configured for mechanical fastening to another web component.

11. The web component of claim 1, wherein an opening is defined through a central portion of the sheet metal member.

12. The web component of claim 11, wherein a flange is defined around the opening.

13. The web component of claim 1, wherein the sheet metal member has a curved configuration.

14. The web component of claim 1, wherein the sheet metal member has a curved periphery.

15. The web component of claim 1, wherein each protrusion of the plurality of protrusions is substantially uniform in configuration.

16. The web component of claim 1, wherein the plurality of protrusions are arranged in a pattern corresponding to the portion of the periphery.

17. The web component of claim 1, wherein each protrusion of the plurality of protrusions is substantially equidistant from an edge of the portion of the periphery.

18. A method of making a web component suitable for use with a snap-fit assembly, the method comprising:
cutting a substantially planar sheet metal member in a predetermined pattern to form a periphery;
forming a plurality of protrusions in a region proximate a portion of the periphery and inset from the portion of the periphery, the plurality of protrusions projecting from a first side and from a second side of the web component in an alternating pattern, and
forming a plurality of depressions extending into the first side and into the second side, the plurality of depressions disposed in the region, the plurality of depressions being aligned with the plurality of protrusions,
wherein each depression of the plurality of depressions is spaced apart from each protrusion of the plurality of protrusions along the first side and the second side,
wherein the web component has a central region located within the periphery, wherein the region forms an outer border of the central region, wherein the central region is free of protrusions and depressions, and wherein the central region comprises a majority portion of the sheet metal member.

19. The method of claim 18, wherein forming the plurality of protrusions comprises one of stamping or dimpling the plurality of protrusions into the web component and cold rolling the plurality of protrusions into the web component.

20. A web component suitable for use with a snap-fit assembly, the web component comprising:
a unitary sheet metal member having a periphery and a first side and a second side, the sheet metal member including a plurality of protrusions integral with the sheet metal member, the plurality of protrusions extending from a first surface of the first side and from a second surface of the second side, the plurality of protrusions disposed in a region proximate a portion of the periphery and inset from the portion of the periphery, the sheet metal member further including a plurality of depressions extending into the first surface and into the second surface, the plurality of depressions being disposed in the region, the plurality of depressions being aligned with the plurality of protrusions, each depression of the plurality of depressions on the first side forming each oppositely disposed protrusion of the plurality of protrusions on the second side and each depression of the plurality of depressions on the second side forming each oppositely disposed protrusion of the plurality of protrusions on the first side, the sheet metal member having a central region located within the periphery, the region forming an outer border of the central region, the central region being free of protrusions and depressions, the central region comprising a majority portion of the unitary sheet metal member,
wherein each protrusion of the plurality of protrusions alternates between the first surface and the second surface and the plurality of protrusions are disposed in a substantially continuous and uninterrupted pattern along the portion of the periphery and an opening is defined through a central portion of the sheet metal member and a flange is defined around the opening and each protrusion of the plurality of protrusions is substantially uniform in configuration and the plurality of protrusions are arranged in a pattern corresponding to the portion of the periphery and each protrusion of the plurality of protrusions is substantially equidistant from an edge of the portion of the periphery.

* * * * *